(12) United States Patent
Beeken et al.

(10) Patent No.: US 10,303,360 B2
(45) Date of Patent: May 28, 2019

(54) REPLICATING DATA IN A DATA STORAGE SYSTEM

(71) Applicant: International Business Machines Corporation, Armonk, NY (US)

(72) Inventors: Christopher B E Beeken, Eastleigh (GB); Christopher Canto, Hursley Winchester (GB); Gordon J. Cockburn, Southampton (GB); John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 14/871,068

(22) Filed: Sep. 30, 2015

(65) Prior Publication Data

US 2017/0091044 A1 Mar. 30, 2017

(51) Int. Cl.
*G06F 17/30* (2006.01)
*G06F 3/06* (2006.01)
*G06F 11/20* (2006.01)

(52) U.S. Cl.
CPC .............. *G06F 3/06* (2013.01); *G06F 17/30* (2013.01); *G06F 17/30575* (2013.01); *G06F 11/2094* (2013.01)

(58) Field of Classification Search
CPC ............. G06F 11/2058; G06F 11/2064; G06F 11/2094; G06F 17/30581; G06F 17/30575
See application file for complete search history.

(56) References Cited

U.S. PATENT DOCUMENTS

| | | | | |
|---|---|---|---|---|
| 5,694,596 A | * | 12/1997 | Campbell | ......... G06F 17/30581 707/827 |
| 5,835,911 A | * | 11/1998 | Nakagawa | ................ G06F 8/65 |
| 5,937,405 A | * | 8/1999 | Campbell | ......... G06F 17/30581 |
| 6,173,377 B1 | | 1/2001 | Yanai et al. | |
| 6,377,951 B1 | * | 4/2002 | Campbell | ......... G06F 17/30581 |

(Continued)

FOREIGN PATENT DOCUMENTS

WO 2015183301 A1 12/2015

OTHER PUBLICATIONS

Zaharia et al., "Discretized Streams: An Efficient and Fault-Tolerant Model for Stream Processing on Large Clusters," 4th USENIX Workshop on Hot Topics in Cloud Computing, HotCloud '12, Jun. 12-13, 2012, Boston, MA, pp. 1-6.

(Continued)

*Primary Examiner* — Jean M Corrielus
(74) *Attorney, Agent, or Firm* — Kristofer L. Haggerty

(57) ABSTRACT

A first data storage device receives a first write request from a host device to update a first subset of the data regions and sends the first write request to a second data storage device. Prior to receiving a notification from the second device that it has been updated in accordance with the first write request, the first device receives a second write request from the second device to update a second subset of the data regions and one of the two devices is selected. If the first device is selected, the first device updates only its data regions that are in the second subset but not in the first subset according to the second write request. In the case that the second device is selected, the first device updates its data regions that are in the second subset according to the second write request.

12 Claims, 6 Drawing Sheets

(56) References Cited

U.S. PATENT DOCUMENTS

| | | | |
|---|---|---|---|
| 6,678,809 B1* | 1/2004 | Delaney | G06F 3/0617 |
| | | | 707/999.202 |
| 7,103,586 B2 | 9/2006 | Holenstein et al. | |
| 7,177,866 B2 | 2/2007 | Holenstein et al. | |
| 7,237,078 B2* | 6/2007 | Hiraiwa | G06F 3/061 |
| | | | 711/162 |
| 7,293,050 B2* | 11/2007 | Arakawa | G06F 11/2058 |
| 7,340,743 B1 | 3/2008 | Anural et al. | |
| 7,376,078 B1 | 5/2008 | Amiocangioli et al. | |
| 8,346,719 B2 | 1/2013 | Sudhakar | |
| 8,868,857 B2 | 10/2014 | Wilkinson | |
| 8,868,874 B2 | 10/2014 | Wilkinson | |
| 8,874,680 B1* | 10/2014 | Das | H04L 67/1095 |
| | | | 709/212 |
| 9,032,160 B1 | 5/2015 | Natanzon et al. | |
| 9,229,827 B2 | 1/2016 | Burr et al. | |
| 9,244,997 B1 | 1/2016 | Natanzon et al. | |
| 9,459,804 B1 | 10/2016 | Natanzon et al. | |
| 9,575,857 B1 | 2/2017 | Natanzon | |
| 2004/0260726 A1 | 12/2004 | Hrle et al. | |
| 2005/0071708 A1 | 3/2005 | Bartfai et al. | |
| 2007/0050573 A1* | 3/2007 | Arakawa | G06F 11/2058 |
| | | | 711/162 |
| 2007/0226277 A1 | 9/2007 | Holenstein et al. | |
| 2013/0198477 A1* | 8/2013 | Wilkinson | G06F 11/2064 |
| | | | 711/167 |
| 2013/0315258 A1* | 11/2013 | Narvaez | H04J 3/062 |
| | | | 370/409 |
| 2015/0067387 A1* | 3/2015 | Liao | G06F 11/2094 |
| | | | 714/6.3 |
| 2015/0370700 A1* | 12/2015 | Sabol | G06F 12/0246 |
| | | | 711/103 |
| 2016/0004616 A1 | 1/2016 | Narita et al. | |
| 2016/0274796 A1 | 9/2016 | Braddy | |
| 2017/0039099 A1 | 2/2017 | Ottavio | |
| 2017/0091044 A1 | 3/2017 | Beeken et al. | |

OTHER PUBLICATIONS

Parno et al., "Distributed Detection of Node Replication Attacks in Sensor Networks," Proceedings of the 2005 IEEE Symposium on Security and Privacy (S&P'05), May 8-11, 2005, Oakland, CA, USA, Date Added to IEEE Xplore: May 23, 2005, pp. 1-15.

EMC, "EMC VNX Replication Technologies: An Overview, Abstract: This white paper highlights the VNX replication technologies. It provides information on EMC, MirrorView, VNX Replicator, RecoverPoint, Replication Manager, Symmetrix, Remote Data Facility (SRDF), and VPLEX", Nov. 2015, pp. 1-34.

Mell et al., "The NIST Definition of Cloud Computing," National Institute of Standards and Technology, U.S. Department of Commerce, Special Publication 800-145, Sep. 2011, pp. 1-7.

Rostagni et al., Pending U.S. Appl. No. 15/598,362, filed May 18, 2017, titled "Collision Detection at Multi-Node Storage Sites,", pp. 1-50.

IBM: List of IBM Patents or Patent Applications Treated as Related (Appendix P), Jan. 29, 2018, pp. 1-2.

Rostagni et al., Pending U.S. Appl. No. 15/877,405, filed Jan. 23, 2018, titled "Handling Node Failure in Multi-Node Data Storage Systems,", pp. 1-41.

IBM: List of IBM Patents or Patent Applications Treated as Related (Appendix P), Feb. 5, 2018, pp. 1-2.

Rostagni et al., Pending U.S. Appl. No. 15/888,307, filed Feb. 5, 2018, titled "Collision Detection at Multi-Node Storage Sites,", pp. 1-40.

\* cited by examiner

REPLICATING DATA IN A DATA STORAGE SYSTEM

TECHNICAL FIELD

The present invention relates to replicating data in a data storage system, and more particularly to preventing inconsistent backups.

BACKGROUND

In data storage systems, it is often useful to have stored data replicated in multiple locations, so that the data is available locally in each of the locations. Each location will have a local data storage device, which can satisfy requests to read data on its own, i.e. without needing to query other data storage devices of the data storage system. However, requests to write data need to be distributed to each location, so that they can be applied in a consistent fashion. In particular, if multiple write requests are made to a particular region of storage, such as a block, sector or page of data in the storage, the writes must be applied in the same order by each local data storage device, otherwise the data stored in each local data storage device will not be the same. When write requests are received that could potentially not be applied in the same order on different local data storage devices, this is known as a "write collision".

A known solution to write collisions is to use one location to process write requests made to any of the locations, and distribute the result of that processing to the other locations, so that the data in each location is consistent. However, this means that for any location other than the location that processes the write requests, the time taken to complete a write request will be at least two times the round-trip-time between the locations.

U.S. Pat. No. 8,868,857 B2, published 21 Oct. 2014, discloses a method of managing remote data replication in which an index generator generates an ordered index of writes made to replicated data storage.

SUMMARY

Embodiments of the present invention disclose a method, system, and computer program product for replicating data in a data storage system. A first data storage device receives a first write request from a host device to update a first subset of the data regions and sends the first write request to a second data storage device. Prior to receiving a notification from the second device that it has been updated in accordance with the first write request, the first device receives a second write request from the second device to update a second subset of the data regions and one of the two devices is selected. If the first device is selected, the first device updates only its data regions that are in the second subset but not in the first subset according to the second write request. In the case that the second device is selected, the first device updates its data regions that are in the second subset according to the second write request.

DETAILED DESCRIPTION

Figure 1:
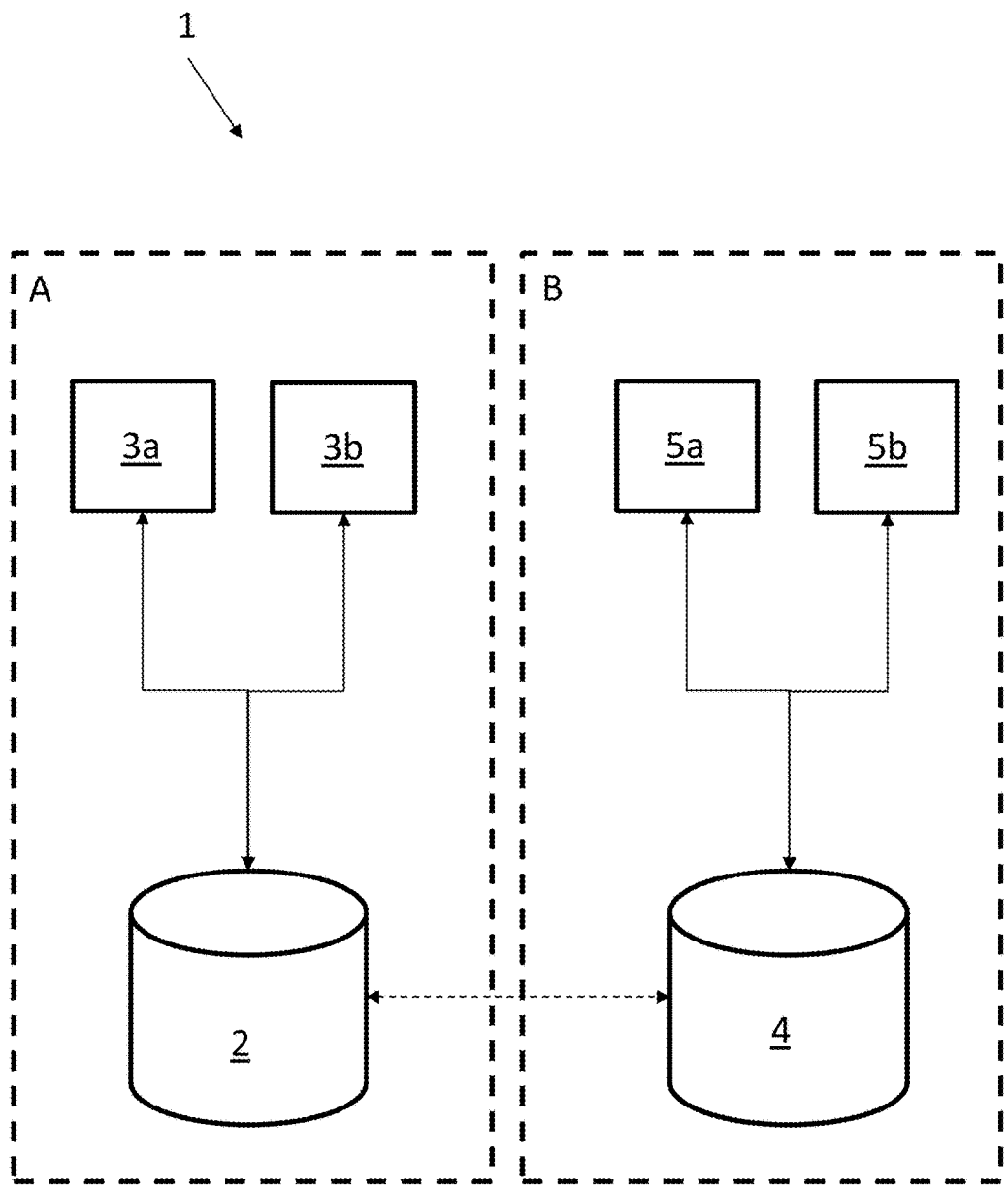
FIG. 1 is a schematic diagram of a data storage system in accordance with an embodiment of the invention.

A data storage system in accordance with an embodiment of the invention is shown in FIG. 1. The data storage system 1 at a site A comprises a first data storage device 2 and host devices 3a and 3b, amongst others, in communication with the first data storage device 2. The host devices 3a and 3b make requests to read data from, and write data to, the first data storage device 2. The data storage system 1 further at a site B comprises a second data storage device 4 and host devices 5a and 5b, amongst others, in communication with the second data storage device 4. Similarly, the host devices 5a and 5b make requests to read data from, and write data to, the second data storage device 4.

The first data storage device 2 and second data storage device 4 are in communication with each other, so that the data they store is replicated at each of site A and B, as described in detail below.

In the present embodiment, it is determined that the first data storage device 2 is the leader and second data storage device 4 is the follower, the significance of which is explained below. This may be determined by comparing a unique ID of each, such as their MAC address, and determining that the first data storage device 4 has the higher unique ID, for example. In alternative embodiments, other methods of determining which of the first data storage device 2 and the second data storage device 4 is the leader can be used.

Figure 2:
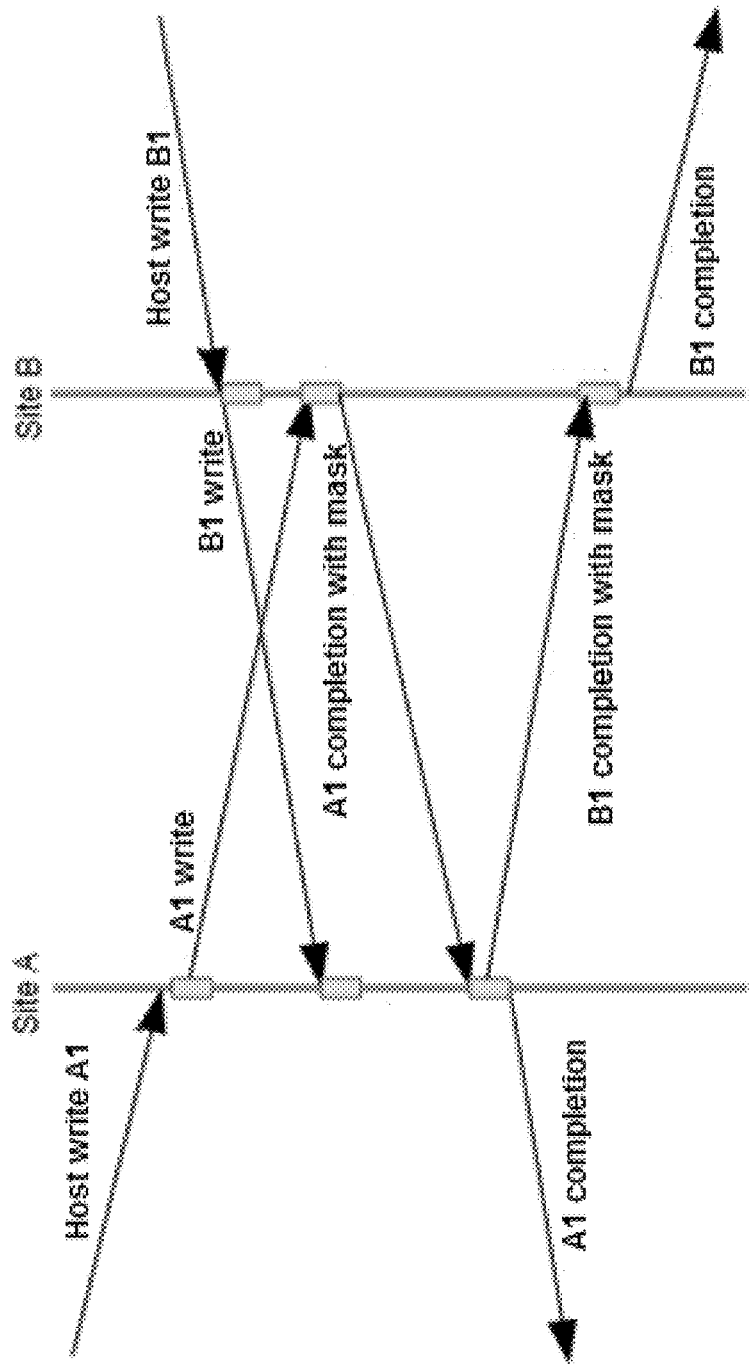
FIG. 2 is a schematic diagram showing a first example of the data storage system of FIG. 1 when handling colliding write requests, in accordance with an embodiment of the invention.

A first example of the handling of colliding write requests to the first data storage device 2 and second data storage device 4 is now described with reference to FIG. 2. In this example, both the first data storage device 2 and the second data storage device 4 detect a collision. This is the most common way in which collisions will occur.

A write request A1 is received by the first data storage device 2 at site A, in this example from the host device 3a. The write request A1 is applied to the first data storage device 2, and then passed to the second data storage device 4 at site B. In addition, a write request B1 is received by the second data storage device 4 at site B, in this example from the host device 5a, applied to the second data storage device 4, and passed to the first data storage device 2. The write requests can be received in either order, but the write request A1 is received, applied and passed on at the first data storage device 2 before the first data storage device 2 receives the write request B1 from the second data storage device 4; and similarly the write request B1 is received, applied and passed on at the second data storage device 4 before the second data storage device 4 receives the write request A1 from the first data storage device 2.

When the second data storage device 4 receives the write request A1 from the first data storage device 2, it detects that a collision has occurred. However, as the first data storage device 2 has been determined to be the leader, the second data storage device 4 applies the write request A1 completely (i.e. including any regions written to by the write request B1). It then sends a completion notification A1 (i.e. a notification that the write request A1 has been applied) to the first data storage device 2, along with a collision mask indicating the regions of write request B1 overwritten by write request A1.

Either before or after the second data storage device 4 receives the write request A1 from the first data storage device 2, the first data storage device 2 receives the write request B1 from the second data storage device 4, and detects that a collision has occurred. In this case, as the first data storage device 2 has been determined to be the leader, the first data storage device 2 applies only the non-colliding regions of the write request B1 (i.e. not including any regions written to by the write request A1). It then sends a completion notification B1 to the second data storage device 4, along with a collision mask indicating the regions of write request B1 that were not written.

When the first data storage device 2 receives the completion notification A1 from the second data storage device 4, it sends a completion notification A1 to the host device 3a. Similarly, when the second data storage device 4 receives the completion notification B1 from the first data storage device 2, it sends a completion notification B1 to the host device 5a. Both the first data storage device 2 and the second data storage device 4 then know that no further processing of the write requests is required.

In this way, the first data storage device 2 and second data storage device 4 both apply the write request A1 prior to the write request B1, and so the changes made to their data are consistent.

Figure 3:
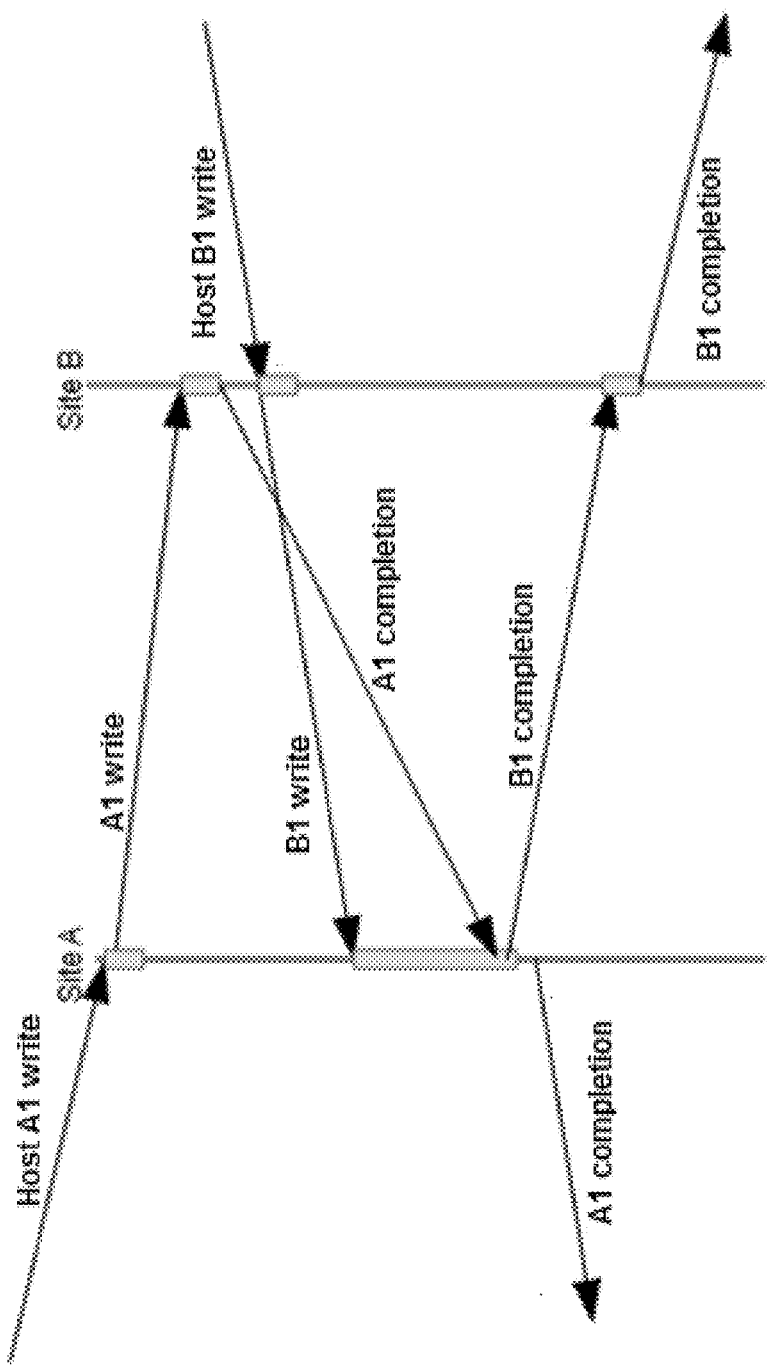
FIG. 3 is a schematic diagram showing a second example of the data storage system of FIG. 1 when handling colliding write requests, in accordance with an embodiment of the invention.

A second example of the handling of colliding write requests to the first data storage device 2 and second data storage device 4 is now described with reference to FIG. 3. This example can only occur in a data storage system in which messages can be received out-of-order; in other words, if two messages sent from a first device to another device can be received in the opposite order to which they are sent. In the case of a data storage system in which message cannot be received out-of-order, only collisions of the type shown in FIG. 1 can occur.

In this example, only the first data storage device 2 detects a collision, and the second data storage device 4 has been passed and applied a write request from the second data storage device 4 prior to it receiving a local write request.

First, a write request A1 is received by the first data storage device 2 from the host device 3a, applied to the first data storage device 2, and passed to the second data storage device 4. The write request A1 is applied to the second data storage device 4, and a completion notification A1 is sent to the first data storage device 2.

Subsequently, a write request B1 is received by the second data storage device 4 from the host device 5a, applied to the second data storage device 4, and passed to the first data storage device 2.

However, at the first data storage device 2 the write request B1 is received before the completion notification A1. When the write request B1 (only) has been received, the first data storage device 2 does not know whether the second data storage device 4 received and applied the write request A1 before it received and applied the write request B1. Consequently, it only applies the write request B1 for regions that do not collide with write request A1; in other words, it only applies the write request B1 to regions that were not written to by write request A1, so that none of the changes made by write request A1 are overwritten.

When the first data storage device 2 subsequently receives the completion notification A1, as the completion notification A1 does not refer to the write request B1, the first data storage device 2 knows that the second data storage device 4 must have received and applied with write request A1 prior to receiving and applying the write request B1. As a result, the first data storage device 2 also applies the colliding regions of the write request B1, overwriting the changes made by the write request A1 to colliding regions. The first data storage device 2 then sends a completion notification B1 to the second data storage device 4, and a completion notification A1 to the host device 3a. When the second data storage device 4 receives the completion notification B1 from the first data storage device 2, it sends a completion notification B1 to the host device 5a.

In this way, the first data storage device 2 and second data storage device 4 both apply the write request A1 prior to the write request B1.

Figure 4:
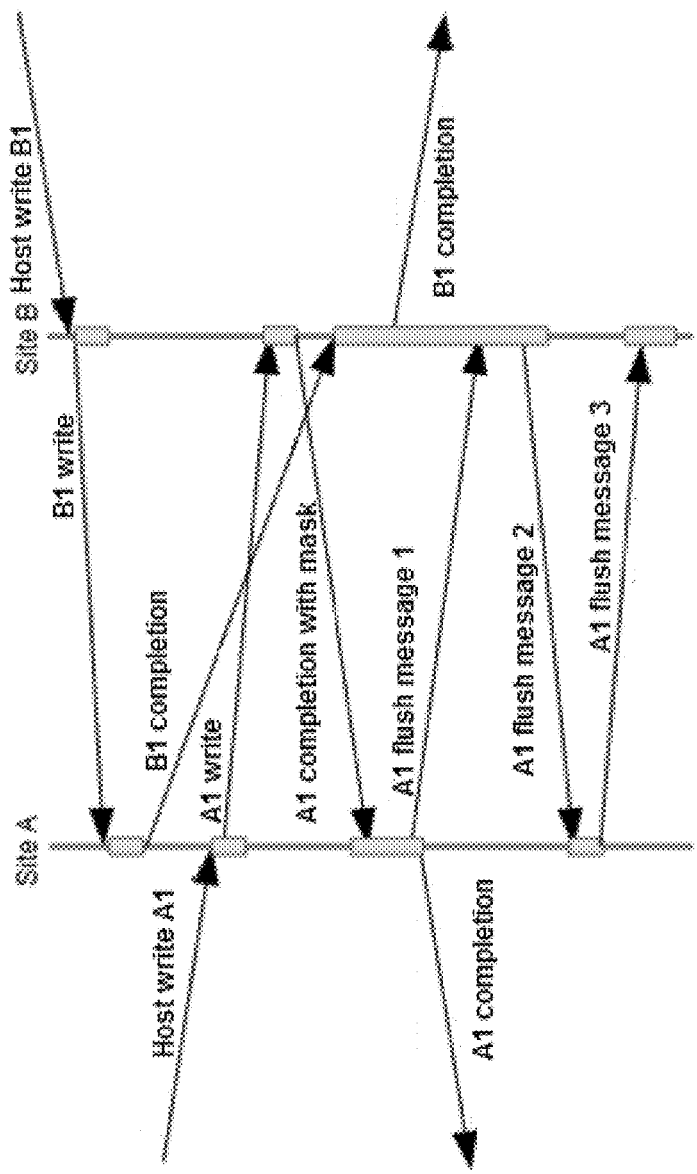
FIG. 4 is a schematic diagram showing a third example of the data storage system of FIG. 1 when handling colliding write requests, in accordance with an embodiment of the invention.

A third example of the handling of colliding write requests to the first data storage device 2 and second data storage device 4 is now described with reference to FIG. 4. Again, this example can only occur in a data storage system in which messages can be received out-of-order. In this example, only the second data storage device 4 detects a collision, and the first data storage device 2 has been passed and applied a write request from the second data storage device 4 prior to it receiving a local write request.

First, a write request B1 is received by the second data storage device 4 from the host device 5a, applied to the second data storage device 4, and passed to the first data storage device 2. The first data storage device 2 applies the write request B1, applied to the first data storage device 2, and completion notification B1 is sent to the second data storage device 4.

A write request A1 is then received by the first data storage device 2 from the host device 3a, applied to the first data storage device 2, and passed to the second data storage device 4. However, the write request B1 is received by the second data storage device 4 before the completion notification B1, and so the second data storage device 4 does not know if the first data storage device 2 applied the write request B1 before it applied the write request A1. However, as the first data storage device 2 has been determined to be the leader, it applies the complete write request A1 anyway (including for any colliding regions). It then sends completion notification A1 to the first data storage device 2, but in addition sends a collision mask indicating the regions of write request B1 overwritten by write request A1.

When the second data storage device 4 subsequently received completion notification B1 from the first data storage device 2, as it does not refer the write request A1 the second data storage device 4 knows that the first data storage device 2 must have applied the write request B1 before the write request A1, and so it is able to send a completion notification B1 to the host device 5a. However, it maintains a lock, as it does not yet know how the first data storage device 2 has processed the write requests.

When the first data storage device 2 receives the completion notification A1 with collision mask, it knows that the second data storage device 4 also applied the write request B1 before the write request A1, and so it sends a flush message 1 to the second data storage device 4, and a completion notification A1 to the host device 3a. However, it also maintains a lock for the time being.

When the second data storage device 4 received the flush message 1, it knows that the first data storage device 2 has processed the write requests so that write request B1 is applied before write request B1, and so it sends a flush message 2 to the first data storage device 2. When the first data storage device 2 received the flush message 2, it sends a flush message 3 to the second data storage device 4, and releases its lock. When the second data storage device 4 receives the flush message 3, it releases its lock.

In this way, both the first data storage device 2 and the second data storage device 4 apply the write request B1 before the write request A1. The locking of the first data storage device 2 and the second data storage device 4 until all the flush messages are received is necessary to allow any required processing of collision masks to be performed, as discussed below.

Figure 5:
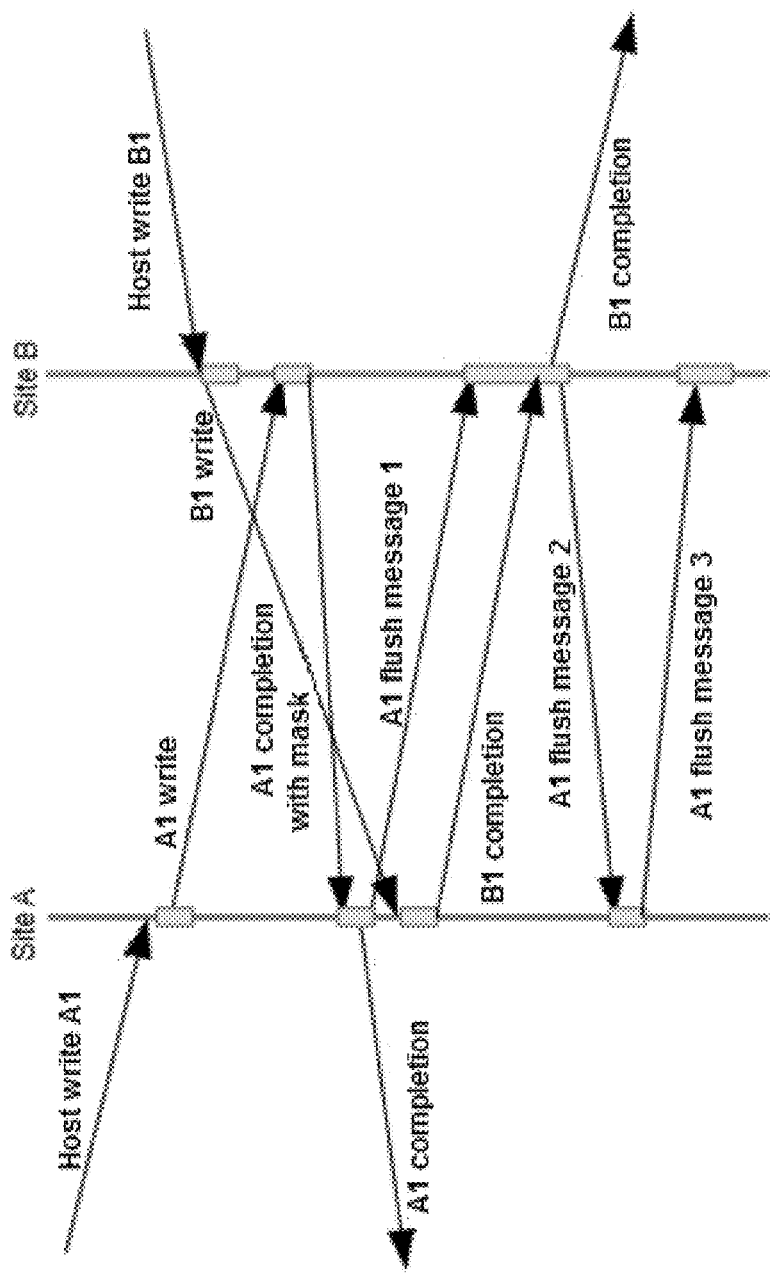
FIG. 5 is a schematic diagram showing a fourth example of the data storage system of FIG. 1 when handling colliding write requests, in accordance with an embodiment of the invention.

A fourth example of the handling of colliding write requests to the first data storage device 2 and second data storage device 4 is now described with reference to FIG. 5. Again, this example can only occur in a data storage system in which messages can be received out-of-order. In this example, only the second data storage device 4 detects a collision, and the first data storage device 2 has received and applied a local write request prior to it being passed a write request by the second data storage device 4.

First, a write request A1 is received by the first data storage device 2 from the host device 3a, applied to the first data storage device 2, and passed to the second data storage device 4. However, before the second data storage device 4 receives the write request A1 from the first data storage device 2, it receives a write request B1 from the host device 5a, applies the write request B1, and passes it to the first data storage device 2.

When the second data storage device 4 subsequently receives the write request A1 from the first data storage device 2, as in the preceding example it does not know if the first data storage device 2 applied the write request B1 before it applied the write request A1, but it applies the complete write request A1 anyway (including for any colliding regions) and sends the completion notification A1 to the first data storage device 2, along with a collision mask indicating the regions of write request B1 overwritten by write request A1.

In the present example the first data storage device 2 next receives the completion notification A1 with collision mask from the second data storage device 4. Due to the collision mask the first data storage device 2 knows that there is write request that it has not yet received from the second data storage device 4. However, again due to the collision mask it knows that the second data storage device 4 applies the write request A1 after the write request B1, and so it is able to send the completion notification A1 to the host device 3a. It then sends a flush message 1 to the second data storage device 4. When the second data storage device 4 receives the flush message 1, it does waits before doing anything further as it is still for a completion notification B1 from the first data storage device 2.

When the first data storage device 2 receives the write request B1, it does not yet apply write request B1 at all as it is still waiting for resolution of the flush messages, but maintains its lock. However, it sends a completion notification B1 to the second data storage device 4, which then sends a completion notification B1 to the host device 5a, and a flush message 2 to the first data storage device 2, but also maintains its lock. When the first data storage device 2 receives the flush message 2, it then applies only the regions of the write request B1 that do not collide with the write request A1, so that it is as if the write request B1 was applied before the write request A1. The first data storage device 2 then sends a flush message 3 to the second data storage device 4 and releases its lock, and when the second data storage device 4 receives the flush message 3 it also releases its lock.

In this way, both the first data storage device 2 and the second data storage device 4 apply the write request A1 before the write request B1.

It will appreciated that embodiments of the invention could include more than two data storage devices, as long as for any pair of data storage devices a characteristic of each device can be used to select one as the "leader" and the other as the "follower". While in the embodiment described above the MAC address of the data storage devices is used, it will be appreciated that any other "static" fact could be used. To give just one alterative example, the data storage devices could be assigned a priority number when they are added to the data storage system.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

Figure 6:
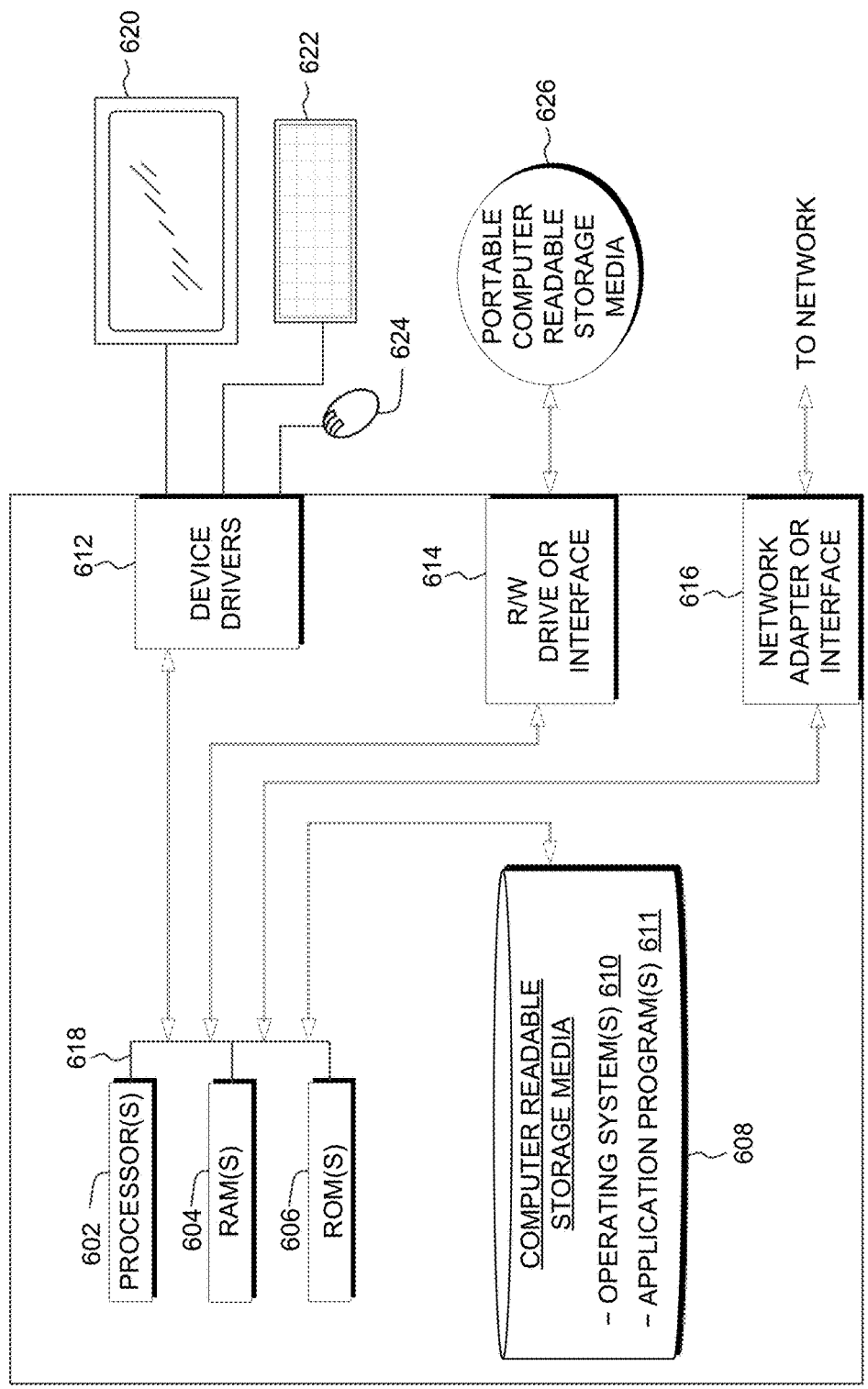
FIG. 6 is a block diagram depicting the hardware components of a data replicating system 1 of FIG. 1, in accordance with an embodiment of the invention.

FIG. 6 depicts a block diagram of components of a computing device of a data replicating system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611 are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device may also include a R/W drive or interface 614 to read from and write to one or more portable computer readable storage media 626. Application programs 611 on computing device may be stored on one or more of the portable computer readable storage media 626, read via the respective R/W drive or interface 614 and loaded into the respective computer readable storage media 608.

Computing device may also include a network adapter or interface 616, such as a TCP/IP adapter card or wireless communication adapter (such as a 4G wireless communication adapter using OFDMA technology). Application programs 611 on computing device may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing device may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of replicating data in a data storage system, wherein the data storage system comprises at least: a first data storage device comprising a set of data regions; a second data storage device comprising a set of data regions corresponding to the set of data regions of the first data storage device; and a first host device in communication with the first data storage device and a second host device in communication with the second data storage device; wherein the method comprises the steps of:
   the first data storage device receiving a first write request from the first host device to update a first subset of the data regions;
   the first data storage device updating data regions that are in the first subset in accordance with the first write request;
   the first data storage device sending the first write request to the second data storage device;
   the second data storage device receiving a second write request to update a second subset of the data regions from the second host device prior to receiving the first write request;
   the second data storage device updating data regions that are in the second subset in accordance with the second write request;
   the second data storage device receiving the first write request;
   the second data storage device updating data regions that are in the first subset in accordance with the first write request;
   the second data storage device sending a notification to the first data storage device indicating that the second data storage device has been updated in accordance with the first write request and a collision mask indicating the regions of the second write request overwritten by the first write request;
   based on the received collision mask, the first data storage device determining that the first data storage device has not received the second write request;
   based on the first data storage device being selected as a leader in the case of a collision between the first write request and the second write request, the first data storage device updating the first subset in accordance with the first write request;
   the first data storage device sending a notification to the second data storage device indicating that the first data storage device has been updated in accordance with the first write request and sending a first flush message;
   based on receiving the flush message, the second data storage device waiting for a notification indicating that the first data storage device has applied the second write request;
   based on receiving the notification indicating that the first data storage device has applied the second write request, the second data storage device sending a second flush message to the first data storage device;
   the first data storage device receiving the second write request from the second data storage device;
   based on receiving the second flush message and the first data storage device being selected as the leader, the first data storage device updating only data regions that are in the second subset but not in the first subset in accordance with the second write request; and
   the first data storage device sending a third flush message to the second data storage device.

2. A method as claimed in claim 1, further comprising:
   based receiving the second write request, the first data storage device locking at least a portion of the set of data regions; and
   based on receiving the second flush message, the first data storage device unlocking the at least the portion of the set of data regions.

3. A method as claimed in claim 1, further comprising:
   based on receiving the first write request, the second data storage device locking at least a portion of the data regions; and
   based on receiving the third flush message, the second data storage device locking the at least the portion of the data regions.

4. A method as claimed in claim 1, wherein the characteristic of the first data storage device and the second data storage device is the MAC address of the first data storage device and the second data storage device.

5. A computer system for replicating data in a data storage system, wherein the system comprises at least: a first data storage device comprising a set of data regions; a second data storage device comprising a set of data regions corresponding to the set of data regions of the first data storage device; a first host device in communication with the first data storage device and a second host device in communication with the second data storage device; and one or more computer-readable storage media and program instructions stored on the one or more computer-readable storage media, the program instructions comprising:
   program instructions to receive, by the first data storage device, a first write request from the first host device to update a first subset of the data regions;

program instructions to update, by the first data storage device, data regions that are in the first subset in accordance with the first write request;
program instructions to send, by the first data storage device, the first write request to the second data storage device;
program instructions to receive, by the second data storage device, a second write request to update a second subset of the data regions from the second host device prior to receiving the first write request;
program instructions to update, by the second data storage device, data regions that are in the second subset in accordance with the second write request;
program instructions to receive, by the second data storage device, the first write request;
program instructions to update, by the second data storage device, data regions that are in the first subset in accordance with the first write request;
program instructions to send, by the second data storage device, a notification to the first data storage device indicating that the second data storage device has been updated in accordance with the first write request and a collision mask indicating the regions of the second write request overwritten by the first write request;
based on the received collision mask, program instructions to determine, by the first data storage device, that the first data storage device has not received the second write request;
based on the first data storage device being selected as a leader in the case of a collision between the first write request and the second write request, program instructions to update, by the first data storage device, the first subset in accordance with the first write request;
program instructions to send, by the first data storage device, a notification to the second data storage device indicating that the first data storage device has been updated in accordance with the first write request and send a first flush message;
based on receiving the flush message, program instructions to wait, by the second data storage device, for a notification indicating that the first data storage device has applied the second write request;
based on receiving the notification indicating that the first data storage device has applied the second write request, program instructions to send, by the second data storage device, a second flush message to the first data storage device;
program instructions to receive, by the first data storage device, the second write request from the second data storage device;
based on receiving the second flush message and the first data storage device being selected as the leader, program instructions to update, by the first data storage device, only data regions that are in the second subset but not in the first subset in accordance with the second write request; and
program instructions to send, by the first data storage device, a third flush message to the second data storage device.

6. The computer system of claim 5, further comprising:
based receiving the second write request, program instructions to lock, by the first data storage device, at least a portion of the set of data regions; and
based on receiving the second flush message, program instructions to unlock, by the first data storage device, the at least the portion of the set of data regions.

7. The computer system of claim 5, further comprising:
based on receiving the first write request, program instructions to lock, by the second data storage device, at least a portion of the set of data regions; and
based on receiving the third flush message, program instructions to unlock, by the second data storage device, the at least the portion of the set of data regions.

8. The computer system of claim 5, wherein the characteristic of the first data storage device and the second data storage device is the MAC address of the first data storage device and the second data storage device.

9. A computer program product for replicating data in a data storage system comprising at least: a first data storage device comprising a set of data regions; a second data storage device comprising a set of data regions corresponding to the set of data regions of the first data storage device; a first host device in communication with the first data storage device and a second host device in communication with the second data storage device; one or more computer processors, one or more computer-readable storage media, and program instructions stored on one or more of the computer-readable storage media for execution by at least one of the one or more processors, the program instructions comprising:
program instructions to receive, by the first data storage device, a first write request from the first host device to update a first subset of the data regions;
program instructions to update, by the first data storage device, data regions that are in the first subset in accordance with the first write request;
program instructions to send, by the first data storage device, the first write request to the second data storage device;
program instructions to receive, by the second data storage device, a second write request to update a second subset of the data regions from the second host device prior to receiving the first write request;
program instructions to update, by the second data storage device, data regions that are in the second subset in accordance with the second write request;
program instructions to receive, by the second data storage device, the first write request;
program instructions to update, by the second data storage device, data regions that are in the first subset in accordance with the first write request;
program instructions to send, by the second data storage device, a notification to the first data storage device indicating that the second data storage device has been updated in accordance with the first write request and a collision mask indicating the regions of the second write request overwritten by the first write request;
based on the received collision mask, program instructions to determine, by the first data storage device, that the first data storage device has not received the second write request;
based on the first data storage device being selected as a leader in the case of a collision between the first write request and the second write request, program instructions to update, by the first data storage device, the first subset in accordance with the first write request;
program instructions to send, by the first data storage device, a notification to the second data storage device indicating that the first data storage device has been updated in accordance with the first write request and send a first flush message;
based on receiving the flush message, program instructions to wait, by the second data storage device, for a notification indicating that the first data storage device has applied the second write request;

based on receiving the notification indicating that the first data storage device has applied the second write request, program instructions to send, by the second data storage device, a second flush message to the first data storage device;

program instructions to receive, by the first data storage device, the second write request from the second data storage device;

based on receiving the second flush message and the first data storage device being selected as the leader, program instructions to update, by the first data storage device, only data regions that are in the second subset but not in the first subset in accordance with the second write request; and program instructions to send, by the first data storage device, a third flush message to the second data storage device.

10. The computer program product of claim 9, further comprising:

based receiving the second write request, program instructions to lock, by the first data storage device, at least a portion of the set of data regions; and based on receiving the second flush message, program instructions to unlock, by the first data storage device, the at least the portion of the set of data regions.

11. The computer program product of claim 9, further comprising:

based on receiving the first write request, program instructions to lock, by the second data storage device, at least a portion of the set of data regions; and based on receiving the third flush message, program instructions to unlock, by the second data storage device, the at least the portion of the set of data regions.

12. The computer program product of claim 9, wherein the characteristic of the first data storage device and the second data storage device is the MAC address of the first data storage device and the second data storage device.

* * * * *